United States Patent
Fortenbaugh et al.

(10) Patent No.: US 10,093,415 B1
(45) Date of Patent: Oct. 9, 2018

(54) SYSTEM AND METHOD FOR ROTORCRAFT HEADING CONTROL

(71) Applicant: Bell Helicopter Textron Inc., Fort Worth, TX (US)

(72) Inventors: Robert Lee Fortenbaugh, Pantego, TX (US); Jillian Samantha Alfred, Ft. Worth, TX (US); Luke Dafydd Gillett, Grapevine, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 15/464,084

(22) Filed: Mar. 20, 2017

(51) Int. Cl.
*B64C 27/57* (2006.01)
*G05D 1/08* (2006.01)
*G05D 1/02* (2006.01)
*B64C 27/605* (2006.01)
*B64C 27/82* (2006.01)
*B64C 13/50* (2006.01)

(52) U.S. Cl.
CPC .......... *B64C 27/57* (2013.01); *B64C 13/503* (2013.01); *B64C 27/605* (2013.01); *B64C 27/82* (2013.01); *G05D 1/0202* (2013.01); *G05D 1/0816* (2013.01); *G05D 1/0858* (2013.01)

(58) Field of Classification Search
CPC ....... B64C 27/57; B64C 27/605; B64C 27/82; B64C 13/503; G05D 1/0816; G05D 1/0204; G05D 1/0202; G05D 1/0858
See application file for complete search history.

(56) References Cited

U.S. PATENT DOCUMENTS

| | | | |
|---|---|---|---|
| 2,845,623 A | 7/1958 | Iddings | |
| 4,626,998 A * | 12/1986 | Adams | ................ G05D 1/0858 244/178 |
| 8,888,036 B2 * | 11/2014 | Chaduc | ................ B64C 13/503 244/17.13 |
| 2008/0097658 A1 | 4/2008 | Shue et al. | |
| 2013/0261853 A1 | 10/2013 | Shue et al. | |

* cited by examiner

*Primary Examiner* — Michael J Zanelli
(74) *Attorney, Agent, or Firm* — Slater Matsil, LLP

(57) ABSTRACT

In accordance with an embodiment of the present invention, a method of operating a rotorcraft includes operating the rotorcraft in a heading control mode that includes activating a yaw channel path of a heading controller and deactivating a roll channel path of the heading controller when a speed of the rotorcraft is less than a first speed threshold or a heading error is less than a heading error threshold, and activating the roll channel path of the heading controller and deactivating the yaw channel path of the heading controller when the speed of the rotorcraft is greater than a second speed threshold and the heading error is not less than the heading error threshold.

19 Claims, 5 Drawing Sheets

SYSTEM AND METHOD FOR ROTORCRAFT HEADING CONTROL

TECHNICAL FIELD

The present invention relates generally to a system and method for a flight control, and, in particular embodiments, to a system and method for rotorcraft heading control.

BACKGROUND

Fly-by-wire systems in aircraft, as opposed to mechanically controlled systems, use electronic signals to control the flight surfaces and engines in the aircraft. For example, instead of having the pilot controls mechanically linked to the control surfaces via a hydraulic system, the pilot controls are electronically linked to a flight computer, which, in turn, controls flight surface actuators via electronic signals. By further interfacing the flight computer to aircraft sensors, sophisticated control algorithms may be used to provide autopilot functionality, as well as to stabilize and control the aircraft.

While fly-by-wire systems have become commonplace in commercial and civilian fixed wing aircraft, their adoption among rotorcraft, such as helicopters, has been much slower due, in part, to the increased complexity of controlling and stabilizing a rotorcraft. However, by adopting fly-by-wire systems in helicopters, safer operation may be achieved in difficult flight environments such as low speed, low altitude, degraded visual environments and inclement weather. Another area in which fly-by-wire systems may benefit rotorcraft is in the reduction in pilot workload. By providing automated features such as stabilization in response to wind, control axis decoupling, position hold and heading hold functionality, the pilot is freed up to focus on the environment in which he or she flies.

SUMMARY

In accordance with an embodiment of the present invention, a method of operating a rotorcraft includes operating the rotorcraft in a heading control mode that includes activating a yaw channel path of a heading controller and deactivating a roll channel path of the heading controller when a speed of the rotorcraft is less than a first speed threshold or a heading error is less than a heading error threshold, and activating the roll channel path of the heading controller and deactivating the yaw channel path of the heading controller when the speed of the rotorcraft is greater than a second speed threshold and the heading error is not less than the heading error threshold.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
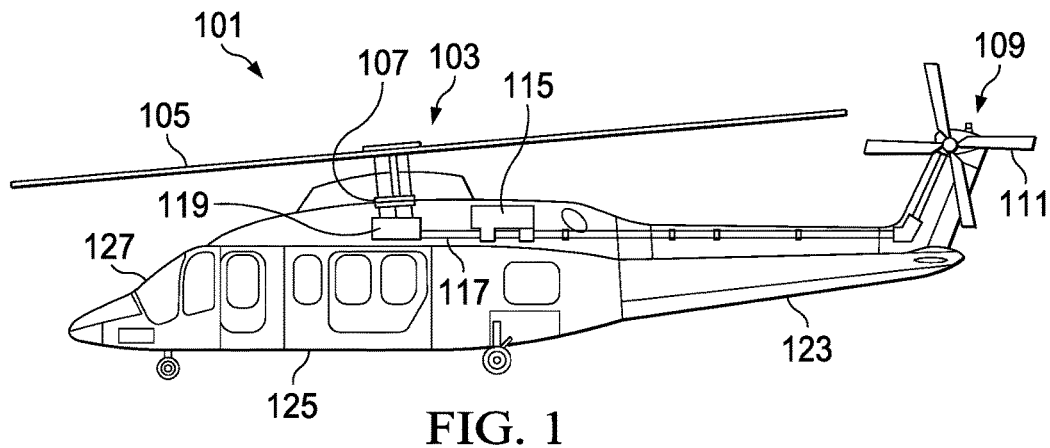
FIG. 1 illustrates an embodiment rotorcraft.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective causes increased power to the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to input flight commands in addition to the stabilization inputs automatically provided by the FBW system. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift or other disturbance to the flight path, and may move the cyclic stick as the FBW system compensates the cyclic control. Thus, when the pilot grasps the cyclic stick to provide some level of manual control to the flight, the cyclic stick is positioned to reflect the actual cyclic settings.

Embodiments of the present disclosure will be described with respect to preferred embodiments in a specific context, namely a system and method for controlling heading in a rotorcraft.

One challenge in the design of fly-by-wire systems for rotorcraft is maintaining heading control due to small heading errors caused by wind gusts and small changes of power within the rotorcraft. In some circumstances, coupling between the roll and yaw channels results in limit cycles in the roll and yaw attitudes in the presence of small heading disturbances. For example, a small disturbance in the yaw axis may be corrected by providing correction in the roll axis. This roll correction, however, provides an error in the roll axis, which may push the rotorcraft further off course or provide over correction, in which case the flight control system provides further correction in order to stabilize the roll axis, as to maintain the desired heading and further correct any errors coupled back in to the yaw axis.

In an embodiment of the present invention, a flight control system selects between using roll correction and yaw correction to maintain a predetermined heading based on both speed of the rotorcraft and the heading error of the rotorcraft. For example, when the rotorcraft is traveling at high speeds and has a high heading error, roll correction via the main rotor is used to place the rotorcraft back on course. However, at lower speeds or lower heading errors, yaw correction via the tail rotor is used to place the rotorcraft back on course. In some embodiments, roll correction is used when the ground speed is greater than 40 kts and the heading error is greater than 3.5° and yaw correction is used when the ground speed is less than 35 kts and the heading error is less than 3.5°. It should be understood that these thresholds are only examples. In alternative embodiments of the present invention, other speed and heading error thresholds may be used depending on the particular rotorcraft system and its specifications.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
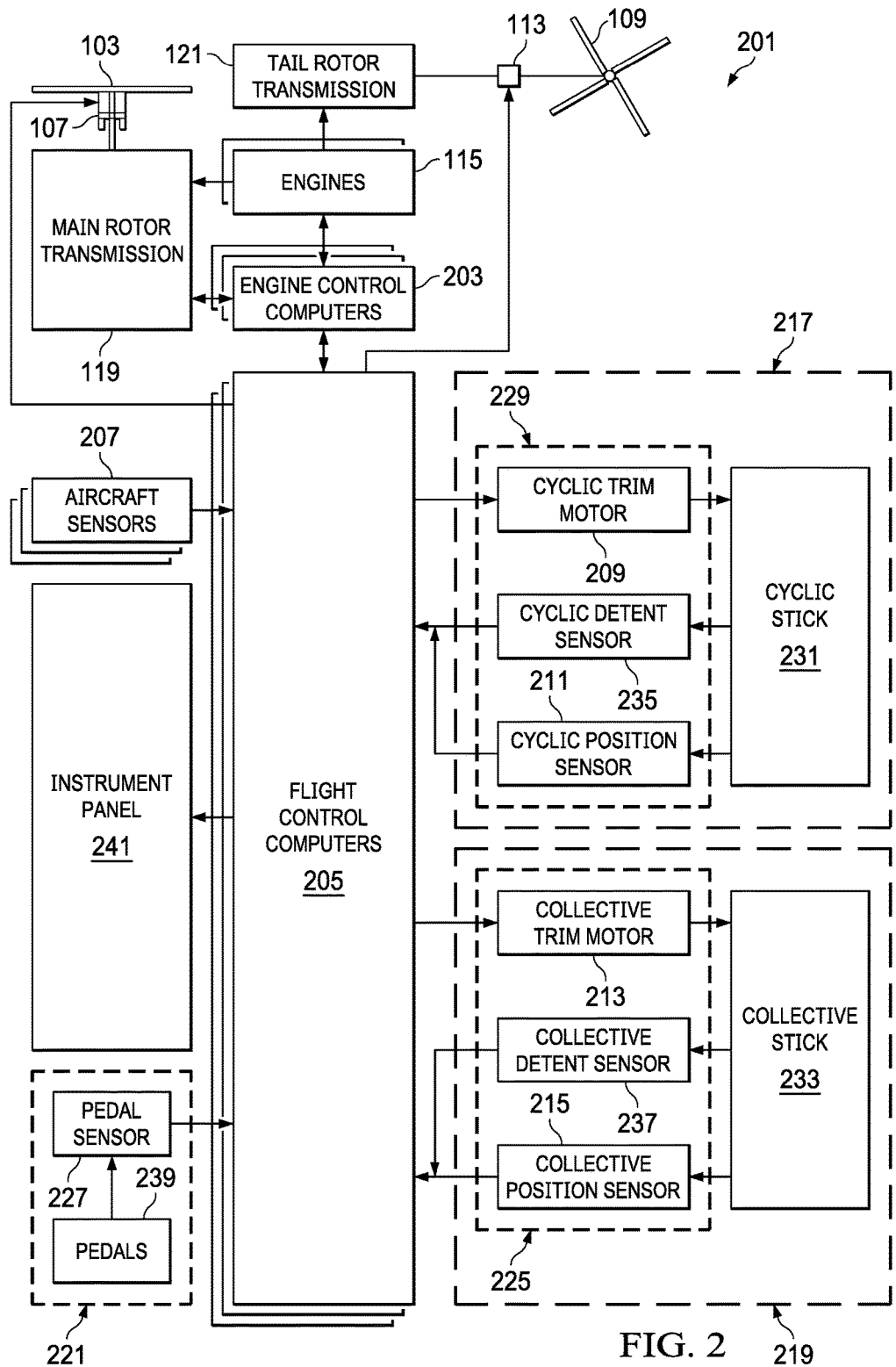
FIG. 2 illustrates a block diagram of an embodiment rotorcraft flight control system.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers 205, and aircraft sensors 207, which collectively adjust the flight control devices.

The flight control system 201 has one or more flight control computers 205 (FCCs). In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such a measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic control stick 231. In some embodiments, the cyclic control stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measure forward/aft and side-to-side position separately. The cyclic position sensors 211 for detecting forward/aft and side-to-side position generate pitch and roll signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic control stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective control stick 233 in the collective control assembly 219. In some embodiments, the collective control stick 233 is a single control stick that moves along a single axis or with a lever type action. A collective position sensor 215 detects the position of the collective control stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective control stick 233. Similar to the determination of the suggested cyclic stick position, in some embodiments, the FCCs 205 determine a suggested collective stick position for the collective control stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is actively controlling the cyclic stick 231, while the collective control assembly 219 has a collective detent sensor 237 that determines whether the pilot is actively controlling the collective stick 233. These detent sensors 235, 237 detect motion and/or position of the respective control stick that is caused by pilot input, as opposed to motion and/or position caused by commands from the FCCs 205, rotorcraft vibration, and the like and provide feedback signals indicative of such to the FCCs. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
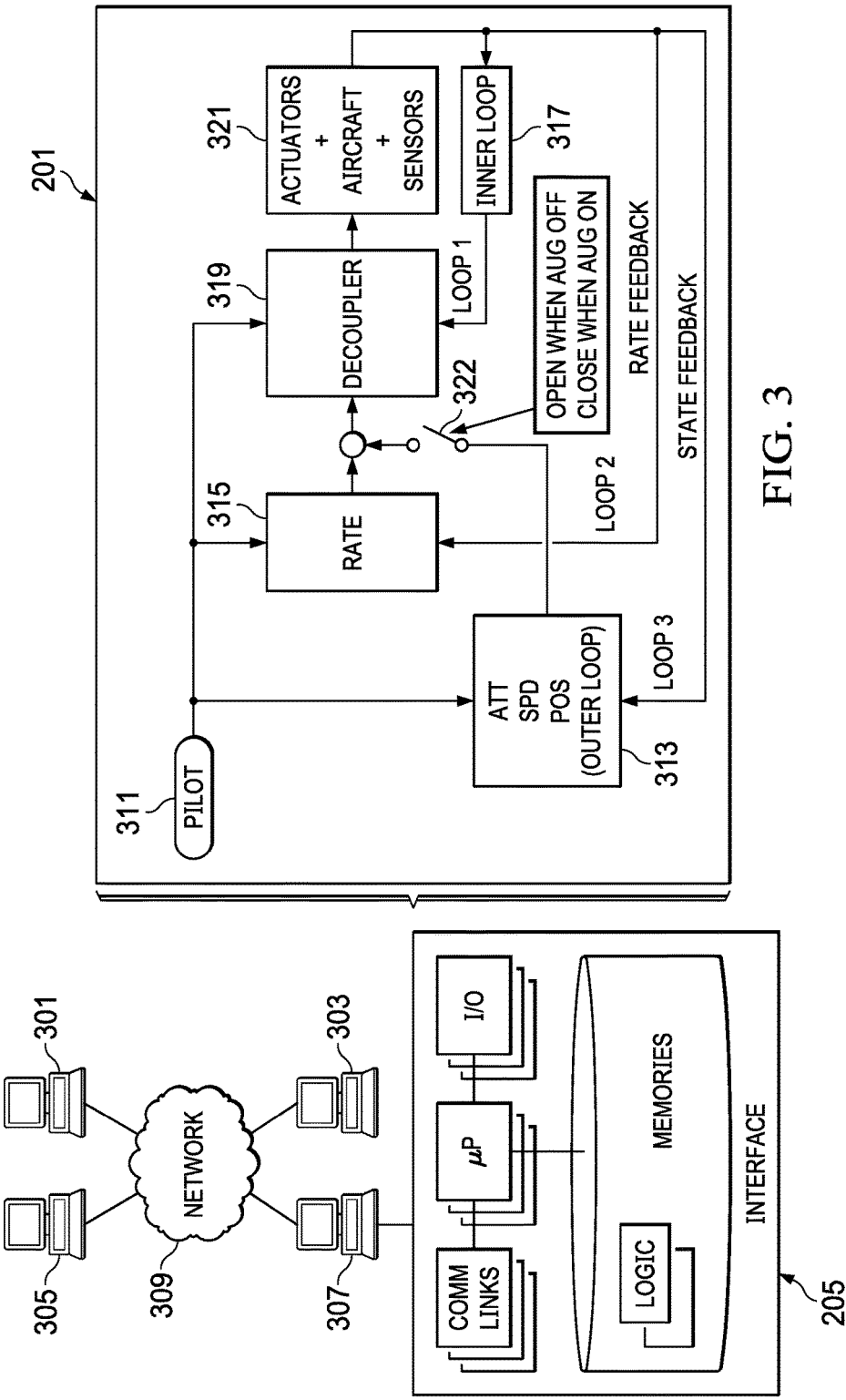
FIG. 3 illustrates a block diagram of an embodiment flight control system.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation for controllability. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

Figure 4:
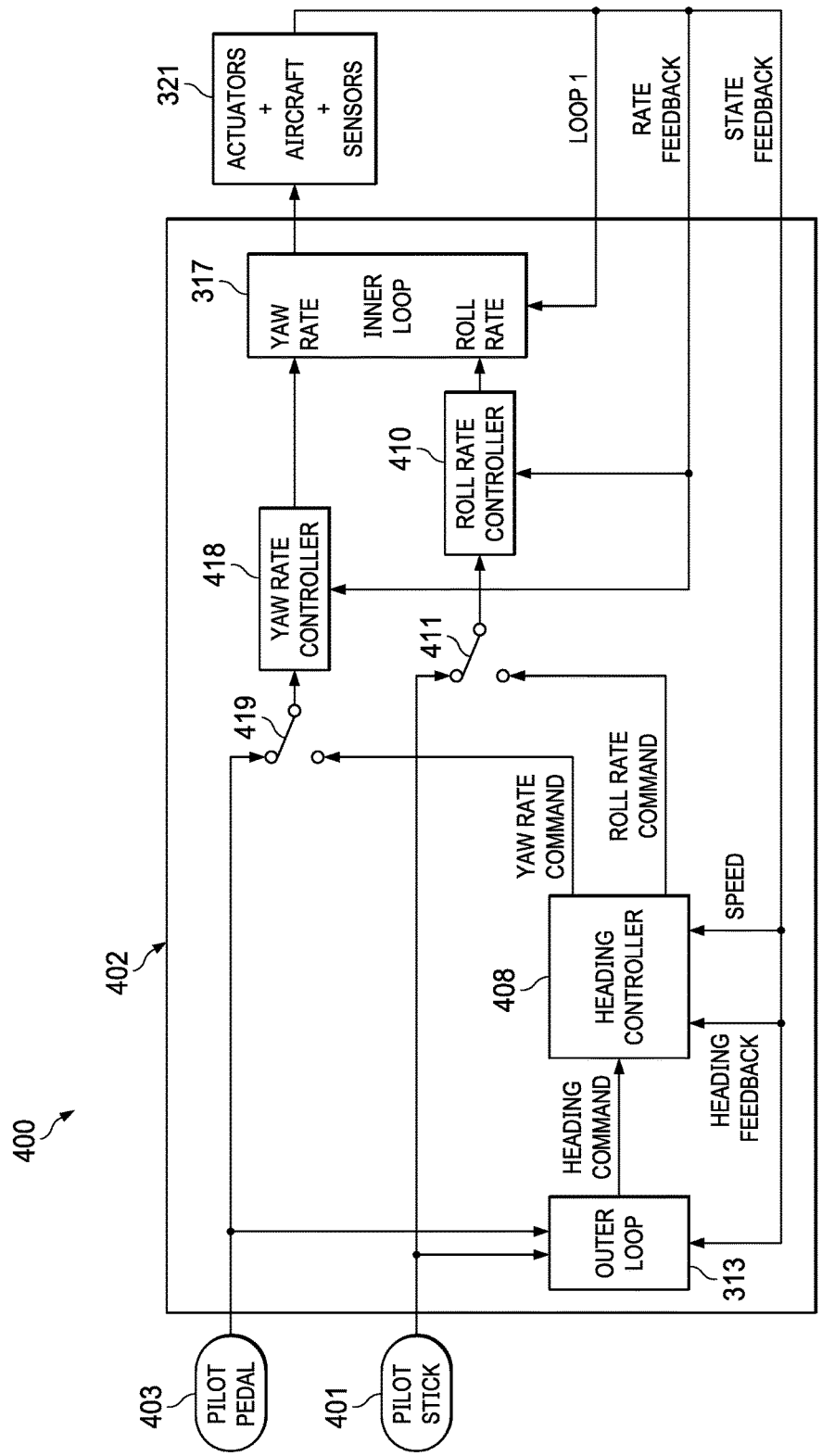
FIG. 4 illustrates a block diagram of a further embodiment flight control system.

FIG. 4 illustrates a flight control system 400 according to an embodiment of the present invention. Pilot stick block 401 represents, for example, the cyclic control assembly 217 of the rotorcraft described above in FIG. 2 and pilot pedal block 403 represents, for example, pedal assembly 221 described above in FIG. 2. As shown, pilot stick block 401 and pilot pedal block 403 interface to flight controller 402. In various embodiments, flight controller 402 is implemented in the flight control computer 205, or other processing hardware. Flight controller 402 also interfaces with and controls aircraft equipment 321 representing various actuators, sensors, and the physical body of the rotorcraft. In various embodiments, flight controller 402 controls aircraft equipment 321 using three loops: an inner loop 317; a rate feedback loop 315 that includes roll rate controller 410 and yaw rate controller 418; and an outer loop 313. The inner loop 317 stabilizes the dynamics of the rotorcraft, the rate loop controls the angular rates of the rotor craft, and the outer loop 313 provides control signals to the rate loops to effect a desired attitude, speed and position of the rotorcraft. In some embodiments, the outer loop 313 supports and provides flight augmentation or auto-pilot functionality and may be manually or automatically disabled based on flight and system conditions. The inner loop 317 and rate feedback loops, on the other hand, remain operational to provide stability to the rotorcraft. Generally, the portions of flight controller 402 that controls the yaw rate, such as yaw rate controller 418 and applicable portions of outer loop 313, heading controller 408 and inner loop 317 may be referred to as a "yaw channel." Similarly, the portions of flight controller 402 that controls the roll rate, such as roll rate controller 410 and applicable portions of outer loop 313, heading controller 408 and inner loop 317 may be referred to as a "roll channel." Each of the yaw channel and roll channel may contain paths or subsections within each channel. It should be understood that flight controller 402 also has a "pitch channel" (not shown) that controls the pitch rate of the rotorcraft.

For purposes of illustration, flight controller 402 is illustrated with respect to the general control blocks that affect the pitch rate and yaw rate of an embodiment rotorcraft. It should be understood that flight controller 402 may also include other controllers and control paths that affect the pitch rate and other states of the rotorcraft in addition to the yaw rate and the roll rate. In various embodiments, the yaw rate of the rotorcraft can be controlled by pilot pedal block 403 via yaw rate controller 418 and the roll rate of the rotorcraft can be controlled by pilot stick block 401 via roll rate controller 410. Each of yaw rate controller 418, roll rate controller 410 and inner loop controller 317 may be implemented using flight control algorithms known in the art.

In various embodiments, outer loop controller 313 in conjunction with heading controller 408 controls the heading of the rotorcraft either by controlling the roll rate of the rotorcraft or by controlling the yaw rate of the rotorcraft. As shown in FIG. 4, outer loop controller 313 generates a heading command that represents an angular direction in the x-y plane in which the rotorcraft is to travel. Heading controller 408 generates the roll rate or yaw rate command based on the heading command and based on heading feedback provided by sensors of aircraft equipment. This heading feedback may be generated, for example, by an on-board global positioning system (GPS), or by a magnetic compass. The heading command may be determined by outer loop controller 313 based on a predetermined heading command provided by an electronic flight director of the rotorcraft, by an autopilot system or by pilot controls. In various embodiments, heading controller 408 is activated by mode control executed by flight computer 205 or by other flight systems in response to flight conditions and/or in response to commands by the pilot of the rotorcraft via pilot controls or instrument panel 241.

As shown, the input to roll rate controller 410 is selected from among the output of pilot stick block 401 and the roll rate command generated by heading controller 408 via switch 411. The output of pilot stick block 401 is selected when the pilot stick is out of detent and the roll rate command generated by heading controller 408 is selected when the pilot stick is in detent. Similarly, the input to yaw rate controller 418 is selected from among the output of pilot pedal block 403 and the yaw rate command generated by heading controller 408 via switch 419. The output of pilot pedal block 403 is selected when the pilot pedal is out of detent and the yaw rate command generated by heading controller 408 is selected when the pilot stick is in detent. Thus, yaw rate controller 418 and roll rate controller 410 processes pilot commands when the pilot is in the loop and processes commands emanating from heading controller 408 when the pilot is not in the loop. It should be understood that switches 411 and 419 are representative of a selection between pilot control generated control signals and heading controller 408 generated control signals. Thus, switches 411 and 419 may be implemented as a selection routine in software.

In some embodiments, commands from pilot stick block 401 and/or pilot pedal block 403 may be zeroed out during embodiment heading modes when the pilot is out of the loop. Alternatively, commands from pilot stick block 401 and/or pilot pedal block 403 may remain active in order to allow the pilot to deviate from the determined heading command. As shown, outer loop controller 313 provides a heading command to controller 408, which in turn calculates a yaw rate command or a roll rate command based on a calculated error between the heading command and heading feedback received from onboard sensors or computers.

Figure 5:
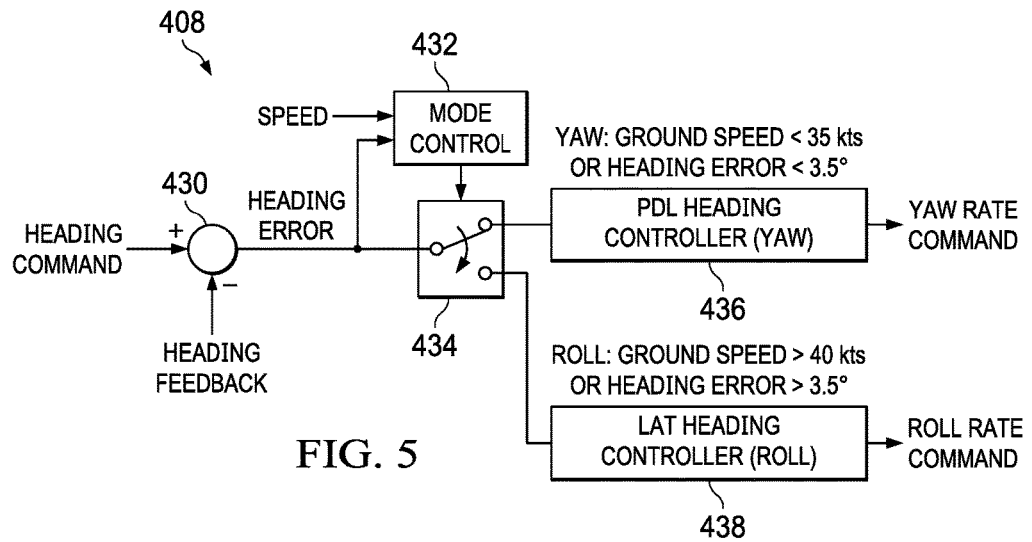
FIG. 5 illustrates a block diagram of an embodiment heading controller.

FIG. 5 illustrates a block diagram of heading controller 408 according to an embodiment of the present invention. As shown, heading controller 408 includes a subtraction block 430 that produces a heading error signal based on a difference between the heading command signal generated by outer loop controller 313 (FIG. 4) and heading feedback received by sensors on the rotorcraft. This heading error is selectably processed either by yaw heading controller 436 or roll heading controller 438 based on the output of mode controller 432. Yaw heading controller 436 includes a first set of control laws that provides a yaw rate command in response to the heading error. This first set of control laws may include, for example, a set of gains and/or lead/lag filters to produce a desired yaw rate. Similarly, roll heading controller 438 includes a second set of control laws that provides a roll rate command in response to the heading error. This second set of control laws may also include, for example, a set of gains and/or lead/lag filters to produce a desired roll angle, which is fed into a further set of control laws that produces the corresponding desired roll rate command. The selection between yaw heading controller 436 and roll heading controller 438 is represented by switch 434 that can be implemented in software, for example, in embodiments in which FCC 205 executes flight control algorithms. Switching between yaw heading controller 436 and roll heading controller 438 may also be accomplished by selectably executing code that implements yaw heading controller 436 or roll heading controller 438 depending on the selected mode. In alternative embodiments, for example, in embodiments, in which heading controller 408 is implemented in hardware using, for example, custom logic or analog circuitry, or is implemented across different circuit components, switch 434 may implemented using transistor switching circuits or logic circuits known in the art.

In an embodiment, yaw heading controller 436 is selected when a measured ground speed of the rotorcraft is less than 35 kts or the heading error is less than 3.5 degrees. Roll heading controller 438, on the other hand, is selected when the speed of the rotorcraft is greater than 40 kts and the heading error is greater than 3.5 degrees. In alternative embodiments, these speed and heading error thresholds may be different depending on the particular rotorcraft system and its specifications. In alternative embodiments of the invention, other parameters besides the heading may be controlled and other control channels besides the yaw and roll channel may be used to control the alternative controlled parameters. For example, the altitude of the rotorcraft may be controlled by the pitch channel for small altitude corrections and by the collective for large altitude corrections.

Figure 6:
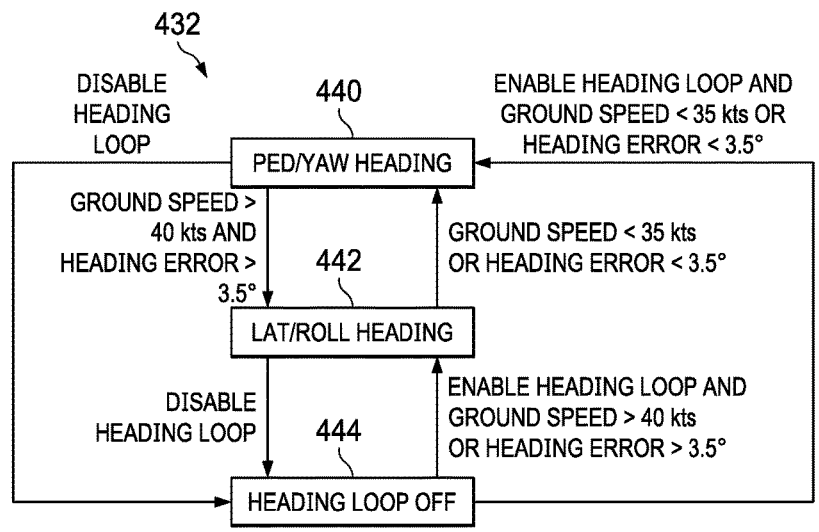
FIG. 6 illustrates an embodiment state diagram.

FIG. 6 illustrates an embodiment state diagram that describes the operation of mode controller 432 shown in FIG. 5 that selects between using roll commands and yaw commands for controlling the heading of the rotorcraft. As shown, operation may start in state 444 in which the heading loop is off or deactivated. State 444 may represent, for example, an operational mode in which the pilot directly controls the various roll rates of the rotorcraft. Alternatively, state 444 could represent an operational mode in which the outer loop controller 313 is using the roll, yaw and/or pitch rates to control other aspects of the rotorcraft such as speed, attitude or turn coordination.

In an embodiment, when the heading loop is enabled (e.g., via heading controller 408), the ground speed is greater than 40 kts, and the heading error is less than 3.5 degrees, operation of mode controller 432 transitions from state 444 to state 442 in which the heading is controlled using roll commands. Alternatively, when the heading loop is enabled and one of the ground speed is less than 35 kts or the heading error is less than 3.5 degrees, operation of mode controller transitions from state 444 to state 440 in which the heading of the rotorcraft is controlled using yaw commands. Generally, when the heading loop is activated and the heading error is less than 3.5 degrees, the state 440 is active.

When mode controller 432 operates in state 440 (yaw heading mode) and the ground speed becomes greater than 40 kts and the heading error becomes greater than 3.5 degrees, operation of mode controller transitions from state 440 to state 442 in which the heading is controlled using roll commands. Likewise, when mode controller 432 operates in state 442 (roll heading mode) and the ground speed becomes less than 35 kts or the heading error becomes less than 3.5 degrees, operation of mode controller transitions from state 442 to state 44o in which the heading is controlled using yaw commands. As is further shown in FIG. 6, states 440 and 442 transition to state 444 (heading loop off) when the heading control loop is disabled. In various embodiments, the difference between the 40 kts ground speed threshold to enter state 440 and the 35 kts ground speed threshold to enter state 442 provides hysteresis that prevents states 440 and 442 from rapidly toggling back and forth between each other. It should be understood that the specific ground speed and heading error threshold are one specific example of a set of thresholds. In alternative embodiments, other ground speed and heading error threshold may be used in accordance with the requirements and specifications of the particular system.

Figure 7:
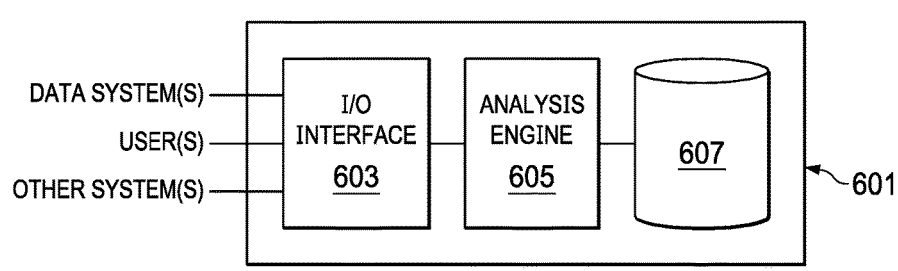
FIG. 7 illustrates a computer system that may be used to implement embodiment control algorithms.

FIG. 7 illustrates a computer system 601. The computer system 601 can be configured for performing one or more functions with regard to the operation of the flight control system 201, as described herein. Further, any processing and analysis can be partly or fully performed by the computer system 601. The computer system 601 can be partly or fully integrated with other aircraft computer systems or can be partly or fully removed from the rotorcraft.

The computer system 601 can include an input/output (I/O) interface 603, an analysis engine 605, and a database 607. Alternative embodiments can combine or distribute the I/O interface 603, the analysis engine 605, and the database 607, as desired. Embodiments of the computer system 601 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the computer system 601. The I/O interface 603 can be configured for allowing one or more users to input information to the computer system 601 via any known input device. Examples can include a keyboard, mouse, touch screen, and/or any other desired input device. The I/O interface 603 can be configured for allowing one or more users to receive information output from the computer system 601 via any known output device. Examples can include a display monitor, a printer, cockpit display, and/or any other desired output device. The I/O interface 603 can be configured for allowing other systems to communicate with the computer system 601. For example, the I/O interface 603 can allow one or more remote computer(s) to access information, input information, and/or remotely instruct the computer system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the computer system 601 to perform one or more of the tasks described herein.

The database 607 provides persistent data storage for the computer system 601. Although the term "database" is primarily used, a memory or other suitable data storage arrangement may provide the functionality of the database 607. In alternative embodiments, the database 607 can be integral to or separate from the computer system 601 and can operate on one or more computers. The database 607 preferably provides non-volatile data storage for any information suitable to support the operation of the flight control system 201 and the method 500, including various types of data discussed further herein. The analysis engine 605 can include various combinations of one or more processors, memories, and software components.

Embodiments of the present invention are summarized here. Other embodiments can also be understood from the entirety of the specification and the claims filed herein. One general aspect includes a method of operating a rotorcraft that includes operating the rotorcraft in a heading control mode that includes activating a yaw channel path of a heading controller and deactivating a roll channel path of the heading controller when a speed of the rotorcraft is less than a first speed threshold or a heading error is less than a heading error threshold; and activating the roll channel path of the heading controller and deactivating the yaw channel path of the heading controller when the speed of the rotorcraft is greater than a second speed threshold and the heading error is not less than the heading error threshold.

Implementations may include one or more of the following features. The method where the heading error threshold is 3.5 degrees and/or method where the first speed threshold is 35 kts and the second speed threshold is 40 kts. In some embodiments the yaw channel path of the heading controller controls a tail rotor of the rotorcraft and the roll channel path of the heading controller controls a swashplate of the rotorcraft. Operating the rotorcraft in the heading control mode may also include determining the heading error based on a heading command and a heading feedback signal.

Another general aspect includes a flight control system for a rotorcraft including: a processor and a non-transitory computer readable storage medium with an executable program stored thereon, the executable program including instructions for: operating the rotorcraft in a heading control mode including: receiving a first parameter from a sensor of the rotorcraft, determining a second parameter error based on a second parameter command and a second parameter feedback signal, activating a first set of control laws of a second parameter controller and deactivating a second set of control laws of the second parameter controller when a first parameter of the rotorcraft is less than a first threshold or a second parameter error of the rotorcraft is less than a second threshold, and activating the second set of control laws of the second parameter controller and deactivating the first set of control laws of the second parameter controller when the first parameter of the rotorcraft is greater than a third threshold and the second parameter error is not less than the second threshold.

Implementations may include one or more of the following features. The flight control system where: the first parameter is a speed of the rotorcraft; the second parameter error is a heading error, the second parameter command is a heading command, the second parameter feedback signal is a heading feedback signal, and the second parameter controller is a heading controller; the first set of control laws includes a yaw channel path; and the second set of control laws includes a roll channel path. The flight control system where the speed of the rotorcraft is a ground speed of the rotorcraft. In an embodiment, the second threshold is 3.5 degrees and/or the first threshold is 35 kts and the third threshold is 40 kts. The first set of control laws may be configured to control a tail rotor of the rotorcraft and the second set of control laws may be configured to control a swashplate of the rotorcraft.

A further general aspect includes a rotorcraft including: a body; a power train coupled to the body and including a power source and a drive shaft coupled to the power source; a main rotor system coupled to the power train and including a plurality of main rotor blades; a tail rotor system coupled to the power train and including a plurality of tail rotor blades; a speed sensor; a flight control system operable to change at least one operating condition of the main rotor system and at least one operating condition of the tail rotor system; a pilot control assembly configured to receive commands from a pilot, where the flight control system is a fly-by-wire flight control system in electrical communication with the pilot control assembly; and a flight control computer in electrical communication between the flight control system and the pilot control assembly, the flight control computer configured to operate the rotorcraft in a heading control mode including receiving a speed signal from the speed sensor, determining a heading error based on a heading command and a heading feedback signal, controlling a heading of the rotorcraft only via the tail rotor system when a speed of the rotorcraft is less than a first speed threshold or the heading error is less than a heading error threshold, and controlling the heading of the rotorcraft only via the main rotor system when the speed of the rotorcraft is greater than a second speed threshold and the heading error is not less than the heading error threshold.

Implementations may include one or more of the following features. The rotorcraft where the heading error threshold is 3.5 degrees. In some embodiments, the second speed threshold is greater than the first speed threshold. For example, the first speed threshold may be 35 kts and the second speed threshold may be 40 kts. Controlling the heading of the rotorcraft via the tail rotor system may include activating a yaw channel path of a heading controller and deactivating a roll channel path of the heading controller; and controlling the heading of the rotorcraft via the main rotor system may include activating the roll channel path of a heading controller and deactivating the yaw channel path of the heading controller. In some embodiments, the yaw channel path of the heading controller is configured to control the tail rotor system and the roll channel path of the heading controller is configured to control the main rotor system.

Advantages of embodiments include the ability of a rotorcraft to maintain an accurate heading in a stable manner in the presence of lateral disturbances, such as wind gusts. Further advantages include the ability for a rotorcraft to more fully utilize its aerodynamic qualities. For example, in embodiments in which the yaw axis of a helicopter reacts more quickly than the roll axis, the use of the pedal axis allows for the use of a higher frequency response. When the heading error becomes too great for the yaw axis to provide a fast correction, then the roll axis may be used for larger changes in heading. Additionally, using pedals decouples heading changes that can be associated with different modes of flight such as rapid power changes from roll oscillations.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a rotorcraft, the method comprising:
   operating the rotorcraft in a heading control mode comprising
      activating a yaw channel path of a heading controller and deactivating a roll channel path of the heading controller when a speed of the rotorcraft is less than a first speed threshold or a heading error is less than a heading error threshold, and
      activating the roll channel path of the heading controller and deactivating the yaw channel path of the heading controller when the speed of the rotorcraft is greater than a second speed threshold and the heading error is not less than the heading error threshold.

2. The method of claim 1, wherein the heading error threshold is 3.5 degrees.

3. The method of claim 1, wherein the second speed threshold is greater than the first speed threshold.

4. The method of claim 3, wherein the first speed threshold is 35 kts and the second speed threshold is 40 kts.

5. The method of claim 1, wherein the yaw channel path of the heading controller controls a tail rotor of the rotorcraft and the roll channel path of the heading controller controls a swashplate of the rotorcraft.

6. The method of claim 1, wherein operating the rotorcraft in the heading control mode further comprises determining the heading error based on a heading command and a heading feedback signal.

7. A flight control system for a rotorcraft comprising:
a processor and a non-transitory computer readable storage medium with an executable program stored thereon, the executable program including instructions for:
operating the rotorcraft in a heading control mode comprising:
receiving a first parameter from a sensor of the rotorcraft,
determining a second parameter error based on a second parameter command and a second parameter feedback signal,
activating a first set of control laws of a second parameter controller and deactivating a second set of control laws of the second parameter controller when a first parameter of the rotorcraft is less than a first threshold or a second parameter error of the rotorcraft is less than a second threshold, and
activating the second set of control laws of the second parameter controller and deactivating the first set of control laws of the second parameter controller when the first parameter of the rotorcraft is greater than a third threshold and the second parameter error is not less than the second threshold.

8. The flight control system of claim 7, wherein:
the first parameter is a speed of the rotorcraft;
the second parameter error is a heading error, the second parameter command is a heading command, the second parameter feedback signal is a heading feedback signal, and the second parameter controller is a heading controller;
the first set of control laws comprises a yaw channel path; and
the second set of control laws comprises a roll channel path.

9. The flight control system of claim 8, wherein the speed of the rotorcraft is a ground speed of the rotorcraft.

10. The flight control system of claim 8, wherein the second threshold is 3.5 degrees.

11. The flight control system of claim 8, wherein the third threshold is greater than the first threshold.

12. The flight control system of claim 11, wherein the first threshold is 35 kts and the third threshold is 40 kts.

13. The flight control system of claim 7, wherein the first set of control laws is configured to control a tail rotor of the rotorcraft and the second set of control laws is configured to control a swashplate of the rotorcraft.

14. A rotorcraft comprising:
a body;
a power train coupled to the body and comprising a power source and a drive shaft coupled to the power source;
a main rotor system coupled to the power train and comprising a plurality of main rotor blades;
a tail rotor system coupled to the power train and comprising a plurality of tail rotor blades;
a speed sensor;
a flight control system operable to change at least one operating condition of the main rotor system and at least one operating condition of the tail rotor system;
a pilot control assembly configured to receive commands from a pilot, wherein the flight control system is a fly-by-wire flight control system in electrical communication with the pilot control assembly; and
a flight control computer in electrical communication between the flight control system and the pilot control assembly, the flight control computer configured to operate the rotorcraft in a heading control mode comprising
receiving a speed signal from the speed sensor,
determining a heading error based on a heading command and a heading feedback signal,
controlling a heading of the rotorcraft only via the tail rotor system when a speed of the rotorcraft is less than a first speed threshold or the heading error is less than a heading error threshold, and
controlling the heading of the rotorcraft only via the main rotor system when the speed of the rotorcraft is greater than a second speed threshold and the heading error is not less than the heading error threshold.

15. The rotorcraft of claim 14, wherein the heading error threshold is 3.5 degrees.

16. The rotorcraft of claim 14, wherein the second speed threshold is greater than the first speed threshold.

17. The rotorcraft of claim 16, wherein the first speed threshold is 35 kts and the second speed threshold is 40 kts.

18. The rotorcraft of claim 14, wherein:
controlling the heading of the rotorcraft via the tail rotor system comprises activating a yaw channel path of a heading controller and deactivating a roll channel path of the heading controller; and
controlling the heading of the rotorcraft via the main rotor system comprises activating the roll channel path of a heading controller and deactivating the yaw channel path of the heading controller.

19. The rotorcraft of claim 18, wherein the yaw channel path of the heading controller is configured to control the tail rotor system and the roll channel path of the heading controller is configured to control the main rotor system.

* * * * *